Sept. 20, 1971                K. HAGEMEISTER                      3,605,441
         INSTALLATION FOR THE TRANSMISSION OF TORQUE BETWEEN A TURBINE
              ROTOR AND A TRANSMISSION AND METHOD OF MANUFACTURE THEREOF
Filed July 23, 1969                                        2 Sheets-Sheet 1

INVENTOR
KLAUS HAGEMEISTER

BY
Craig, Antonelli, Stewart & Hill

ATTORNEYS

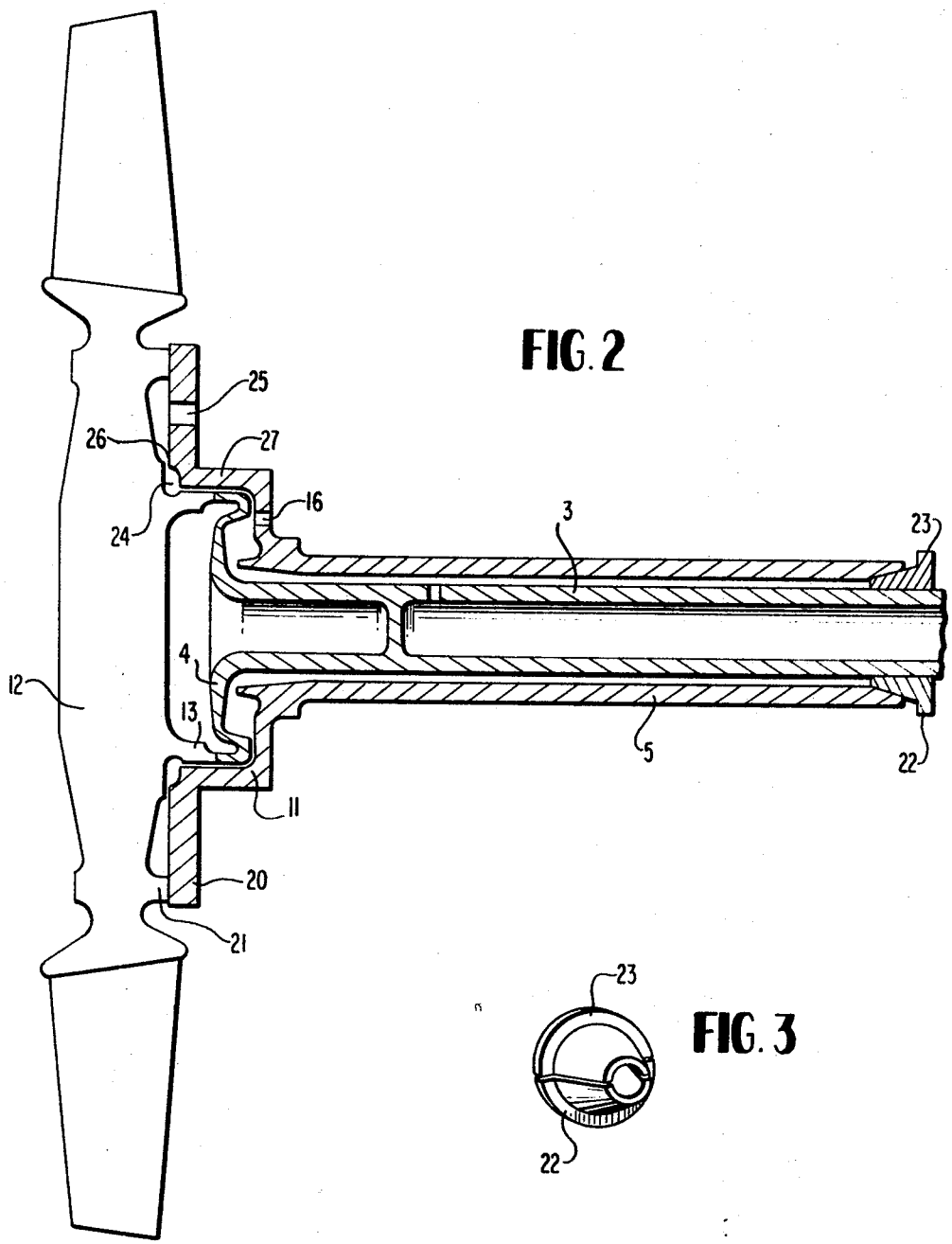

United States Patent Office 3,605,441
Patented Sept. 20, 1971

3,605,441
INSTALLATION FOR THE TRANSMISSION OF TORQUE BETWEEN A TURBINE ROTOR AND A TRANSMISSION AND METHOD OF MANUFACTURE THEREOF
Klaus Hagemeister, Munich, Germany, assignor to Motoren- und Turbinen-Union Muenchen GmbH, Munich, Germany
Filed July 23, 1969, Ser. No. 843,984
Claims priority, application Austria, July 24, 1968, A 7,168/68
Int. Cl. F16d *3/78*
U.S. Cl. 64—13　　　　　　　　　　　　　　　　　11 Claims

ABSTRACT OF THE DISCLOSURE

An installation for the transmission of the torque between a turbine rotor and a transmission which includes separate support and torque-transmitting shafts, and in which for the purpose of compensation of alignment errors between the transmission shaft and the turbine rotor the torque-transmitting shaft passes over at the rotor-end thereof into a flexible torsion-resistant diaphragm which is connected with the rotor and the support shaft. The connection of turbine rotor, support shaft and torque-transmitting shaft is realized by a brazed joint.

---

The present invention relates to an installation for transmitting torque between a turbine rotor and a transmission or gearbox, with a separate support shaft and torque-transmission shaft as well as to a method of manufacture thereof.

As is known, misalignments cannot be completely avoided during the connection of transmissions to turbines. Particularly with the use of a planetary gear unit, an alignment of the axis of the sun gear with the axis of the pitch circle of the planet gears, on the one hand, and with the turbine rotor, on the other, can hardly ever be achieved. Consequently, up to now one has gone over to providing the turbine rotors with rigid shafts which serve exclusively for the bearing support, and to utilize the bending elasticity of a separate, correspondingly long shaft, that is unsupported and only serves for the torque-transmission between turbine and sun gear, for the compensation of alignment errors.

These known arrangement, however, entail the disadvantage that with a weight- and space-saving construction (short, thin shafts), the compensation of only slight alignment errors is possible, and the danger of an over-stressing of the transmission-shaft, particularly at high turbine rotational speeds, cannot be excluded.

Accordingly, it is the aim of the present invention to so improve the known installations that they comply both with the aspect of limited space and weight requirement as also with the aspect of a high operational safety.

As solution to the underlying problems, the present invention proposes that for the purposes of compensation of alignment errors or misalignments between the transmission shaft and the turbine rotor, the torque-transmission shaft passes over at its end on the side of the rotor, into a flexible (bending-elastic), torsion-resistant diaphragm which is coupled to the rotor and to the support shaft. This will enable with short axial lengths and with slight additional weight to considerably increase the adjustability of the connected torque-shaft and of the sun gear mounted at its end.

In a favorable construction of such an arrangement according to the present invention, the separate support shaft of the turbine rotor is to include at the rotor end, a drum-shaped connecting flange, into which the turbine rotor is inserted by by means of an annular shoulder or spigot and the torque-transmission shaft by means of the diaphragm.

This arrangement offers the advantage that the three rotating elements, namely, turbine rotor, support shaft and torque-transmitting shaft are centered with respect to each other.

According to a further feature of the present invention, the drum-like flange is provided for the purpose of guidance of a cooling medium stream, with an annular extension at its inner diameter and with passage bores within the area of the outer diameter. This arrangement is favorable in conjunction with the drum-shaped configuration of the connecting flange of the support shaft because a cooling medium flow connected with the annular space between the hollow support shaft and the torque-transmitting shaft, cools both the diaphragm as also the connecting flange of the support shaft and thus produces an effective heat barrier or heat-insulation between the turbine rotor and the rotor-end bearing of the support shaft. By a corresponding shaping of the anular extension, the cooling medium flows along the diaphragm and is centrifuged or expelled outwardly by the high rotational speed and the thus resulting centrifugal forces through the passage bores in the drum flange. The drum flange therefore serves as centrifugal force pump or radial pump for the cooling medium.

According to a further development of the present invention, the diaphragm is provided between its hub and its outer ring with a cylindrical or conical zone which is capable of readily compensating, by elastic deformation, for any occurring heat stresses within the diaphragm, especially those in a radial direction.

According to a still further feature, the present invention purposes that the connection of turbine rotor, support shaft and torque-transmission shaft is realized by a brazed joint.

Furthermore, the present invention relates to a process for the manufacture of this brazed joint. In accordance therewith, the drum-shaped connecting flange of the support shaft includes a supporting flange, with the aid of which an angularly true-setting and clamping of the rotor is achieved, and which supporting flange is removed by machining or turning after completing the brazed joint. An annular space provided between support flange and rotor serves thereby as reservoir space for the brazing material to be filled in, which from the annular space reaches the cylindrical gap between the annular shoulder or spigot of the rotor and the diaphragm, on the one hand, and the drum flange, on the other.

This arrangement of the reservoir space for the brazing material is particularly favorable because during heating up of the parts to be brazed, the brazing material reaches the brazing temperature later than the capillary gap of the braze joint by reason of the surrounding larger material masses (turbine disk, drum flange, diaphragm outer ring) whereby a reliable inflow of the braze is assured.

Furthermore, the brazing is to take place in such a manner that the necessary centric coaxial setting of the torque-transmitting shaft with respect to the support shaft takes place with the air of conical insert members which are inserted for the brazing operation in the form of two clam-shells or half-shells at the output end between the torque shaft and support shaft.

These and further objects, features, and advantages of the present invention will become more obvious from the following description when taken in connection with the accompanying drawing which shows, for purposes of illustration only, one embodiment in accordance with the present invention, and wherein:

FIG. 2 is a longitudinal axial, cross-sectional view illustrating the setting of the turbine rotor, the torque-transmitting shaft, and the support shaft for the brazing operation; and FIG. 3 is a perspective view illustrating the conical clam-shells which are used for the setting operation.

Figure 1:
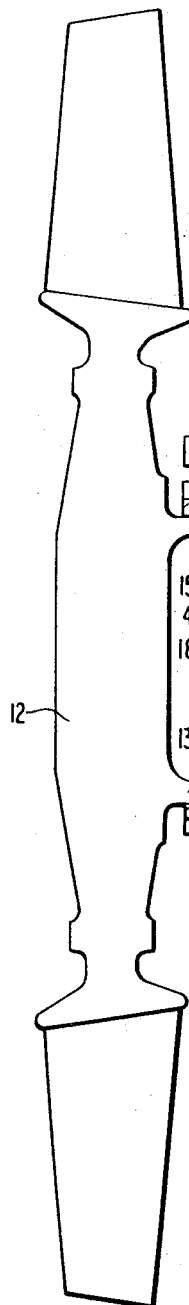
FIG. 1 is a longitudinal, axial cross-sectional view through a torque-transmitting installation in accordance with the present invention.

Referring now to the drawing wherein like reference numerals are used throughout the various views to designate like parts, and more particularly to FIG. 1, the sun gear 1 is secured in this figure on the torque-shaft 3 by means of a drive serration 2. At its turbine end, the torque-shaft 3 passes over into the diaphragm 4. The support shaft 5 is supported in ball bearings 6 and 7. The bearings 6 and 7 are conventionally forced and clamped against a shoulder 10 of the support shaft 5 by way of the spacer sleeve 8 and by means of the nut 9. The support shaft 5 has at its turbine end a drum-shaped flange 11, in which are assembled by brazing the turbine wheel 12 by means of the annular shoulder or spigot 13 and the diaphragm 4 by means of its outer ring 14. The diaphragm 4 is connected with its outer ring 14 by a cylindrical or conical adapter or connecting element 15. Air and oil mist is sucked in through the gap 17 between the support shaft 5 and the torque-shaft 3 from the side of the gear 1 with the aid of bores 16 in the radial part 19 of the drum flange 11, whereby the air and oil mist serves for an intensive cooling of the bearing places. This cooling medium flow is effectively guided toward the diaphragm 4 by an annular extension 18 at the inner diameter of the drum flange 11. This arrangement precludes that the cooling medium flow acts on, i.e., comes in contact directly with the hot turbine disk 12 itself and is thereby heated-up excessively. Additionally, the arrangement of the present invention makes it possible to effectively confine the heat flow from the turbine wheel 12 to the bearing 6 on the turbine side. The path of the heat flow from the hot annular shoulder or spigot 13 of the turbine wheel 12 to the bearing 6 on the turbine side is lengthened by the radial portion 19 of the flange 11 whence the cooled diaphragm acts as heat sink.

The process for the manufacture of the brazed joint between turbine rotor, support shaft and torque-transmitting shaft will be described by reference to the setting illustrated in FIG. 2.

A supporting flange 20 is arranged at the drum-shaped connecting flange 11 of the support shaft 5, on which rests the ring 21 of the turbine wheel 12. An angularly accurate assembly or setting of the finished rotor and support shaft is achieved thereby. The torque shaft 3 is inserted between these two parts by means of the diaphragm 4.

The torque shaft 3 is centrically clamped with respect to the shaft 5 by means of two conical insert members 22 and 23 which are shown in perspective in FIG. 3. The turbine wheel 12 and the shaft flange 11 enclose the reservoir space 24, into which is introduced the braze. The ventilation of the reservoir space 24 takes place by way of the bore 25 in the support flange 20 and by way of the annular gap 26. The bore 16 is so arranged that a visible control is possible whether the braze has filled the gap over the entire length thereof. After completed brazing, the supporting flange 20 is removed and the reservoir space 24 is turned or machined out in order to remove any residual braze which might be distributed possibly non-uniformly over the circumference and thus could effect an unbalance of the turbine rotor. Prior to the mounting of the complete assembly, only the conical half-shells or clam-shells 22 and 23 are finally removed.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are known to those skilled in the art.

I claim:
1. An installation for the transfer of torque between a turbine rotor and a transmission which includes separate support and torque-transmitting shafts, wherein the torque-transmitting shaft is unsupported between the rotor and transmission, characterized in that for the compensation of alignment errors between the transmission shaft and the turbine rotor the torque-transmission shaft passes over at the rotor-end into a flexible, torsion-resistant diaphragm for providing the only connection with the rotor and the support shaft.

2. An installation according to claim 1, characterized in that the support shaft includes a drum-shaped connecting flange at its rotor end, the turbine rotor being inserted into the drum-shaped flange by means of an annular shoulder and the torque-transmitting shaft being inserted into the drum-shaped flange by means of the diaphragm.

3. An installation according to claim 2, characterized in that the drum-shaped flange is provided for the guidance of a cooling medium flow stream with an annular extension at its inner diameter and with passage bores within the area of the outer diameter.

4. An installation according to claim 3, characterized in that the diaphragm is provided between its hub and an outer ring thereof with a cylindrical zone.

5. An installation according to claim 3, characterized in that the diaphragm is provided between its hub and an outer ring thereof with a conical zone.

6. An installation according to claim 3, characterized in that the connection of turbine rotor, support shaft and torque-transmitting shaft is formed by a brazed joint.

7. An installation according to claim 1, characterized in that the support shaft includes a drum-shaped flange which is provided for the guidance of a cooling medium flow with an annular extension at its inner diameter and with passage bores within the area of the outer diameter.

8. An installation according to claim 1, characterized in that the diaphragm is provided between its hub and an outer ring thereof with a cylindrical zone.

9. An installation according to claim 1, characterized in that the diaphragm is provided between its hub and an outer ring thereof with a conical zone.

10. An installation according to claim 1, characterized in that the connection of turbine rotor, support shaft and torque-transmitting shaft is formed by a brazed joint.

11. An installation according to claim 10, characterized in that the support shaft includes a drum-shaped connecting flange at its rotor end, the turbine rotor being inserted into the drum-shaped flange by means of an annular shoulder and the torque-transmitting shaft being inserted into the drum-shaped flange by means of the diaphragm.

References Cited
UNITED STATES PATENTS

| | | | |
|---|---|---|---|
| 3,387,820 | 6/1968 | Smith | 415—219 |
| 2,662,725 | 12/1953 | McVeigh | 29—156.8 |

MARK NEWMAN, Primary Examiner

R. HEALD, Assistant Examiner

U.S. Cl. X.R.
416—170; 415—112